United States Patent
Shah et al.

(10) Patent No.: US 6,404,733 B1
(45) Date of Patent: Jun. 11, 2002

(54) METHOD OF EXERCISING A DISTRIBUTED RESTORATION PROCESS IN AN OPERATIONAL TELECOMMUNICATIONS NETWORK

(75) Inventors: Jasvantrai C. Shah, Richardson; John David Allen, Garland; Sridhar Alagar, Dallas; Bryan McGlade, Plano; Hal Badt, Richardson, all of TX (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/148,943

(22) Filed: Sep. 8, 1998

(51) Int. Cl.[7] .................................................. H04L 1/00
(52) U.S. Cl. ........................................ 370/216; 370/241
(58) Field of Search ............................. 370/216, 217, 370/218, 221, 222, 225, 229, 237, 241, 242, 252, 400, 401, 351, 352, 360; 703/21, 23

(56) References Cited

U.S. PATENT DOCUMENTS

| | | | |
|---|---|---|---|
| 4,648,088 A | 3/1987 | Cagle et al. | 370/224 |
| 4,825,206 A | 4/1989 | Brice, Jr. et al. | 340/825.02 |
| 4,853,927 A | 8/1989 | Wenzel | 370/218 |
| 4,884,263 A | 11/1989 | Suzuki | 370/225 |
| 4,956,835 A | 9/1990 | Grover | 370/228 |
| 5,070,497 A | 12/1991 | Kleine-Altekamp | 370/217 |
| 5,146,452 A | 9/1992 | Pekarske | 370/228 |
| 5,173,689 A | 12/1992 | Kusano | 370/225 |
| 5,189,662 A | 2/1993 | Kleine-Altekamp | 370/227 |
| 5,212,475 A | 5/1993 | Thoma | 340/2.4 |
| 5,218,601 A | 6/1993 | Chujo et al. | 370/228 |
| 5,233,600 A | 8/1993 | Pekarske et al. | 370/228 |
| 5,235,599 A | 8/1993 | Nishimura | 714/4 |
| 5,319,632 A | 6/1994 | Iwasaki | 370/228 |
| 5,325,366 A | 6/1994 | Shinbashi | 714/712 |
| 5,435,003 A | 7/1995 | Chng et al. | 714/4 |
| 5,455,832 A | 10/1995 | Bowmaster | 714/712 |
| 5,479,608 A | 12/1995 | Richardson | 714/4 |
| 5,493,273 A | 2/1996 | Smurlo et al. | 340/541 |
| 5,495,471 A | 2/1996 | Chow et al. | 370/221 |
| 5,537,532 A | 7/1996 | Chng et al. | 714/4 |

(List continued on next page.)

FOREIGN PATENT DOCUMENTS

| | | |
|---|---|---|
| WO | 96/41440 | 12/1996 |
| WO | 97/48189 | 12/1997 |

OTHER PUBLICATIONS

Bouloutas et al., "Alarm Correlation and Fault Identification in Communication Networks"; 1994 IEEE Transactions and Communications.

Manione et al.; "An Inconsistencies Tolerant Approach in the Fault Design of Telecommunications Network"; Feb. 14, 1994.

*Primary Examiner*—Dang Ton
*Assistant Examiner*—Brian Nguyen

(57) ABSTRACT

In a telecommunications network provisioned with a distributed restoration scheme, to determine the reactions and responses of the network while the network is "live" or operational, an exercise information message is provided to the network for presenting a simulated failure or failures thereto. This exercise information message is broadcast to all of the nodes of the network so that every node is aware of the simulated failure scenario. Modified DRA messages that indicate that they are exercise only messages are used by the nodes for executing the exercise restoration process. Such exercise restoration process will proceed as if an actual failure has occurred with the notable exception that no actual cross-connections will be made. Certain functionalities are provisioned to the nodes to allow the exercise restoration process to be aborted if a real failure is detected or upon the expiration of a timer. The exercise restoration process can also be terminated by a command from the network management.

11 Claims, 6 Drawing Sheets

U.S. PATENT DOCUMENTS

| | | | | |
|---|---|---|---|---|
| 5,548,639 A | | 8/1996 | Ogura | 379/221.04 |
| 5,586,112 A | | 12/1996 | Tabata | 370/225 |
| 5,590,118 A | | 12/1996 | Nederlof | 370/218 |
| 5,590,119 A | | 12/1996 | Moran et al. | 370/225 |
| 5,598,403 A | | 1/1997 | Tatsuki | 370/221 |
| 5,623,481 A | | 4/1997 | Russ | 370/225 |
| 5,636,203 A | | 6/1997 | Shah | 370/244 |
| 5,636,206 A | | 6/1997 | Amemiya et al. | 370/244 |
| 5,646,936 A | | 7/1997 | Shah et al. | 370/228 |
| 5,657,320 A | | 8/1997 | Russ et al. | 370/217 |
| 5,680,326 A | * | 10/1997 | Russ et al. | 714/4 |
| 5,710,777 A | | 1/1998 | Gawne | 714/717 |
| 5,721,727 A | | 2/1998 | Ashi et al. | 370/244 |
| 5,734,687 A | | 3/1998 | Kainulainen | 375/357 |
| 5,748,611 A | | 5/1998 | Allen et al. | 370/221 |
| 5,748,617 A | | 5/1998 | McLain, Jr. | 370/244 |
| 5,757,774 A | | 5/1998 | Oka | 370/242 |
| 5,781,535 A | | 7/1998 | Russ et al. | 370/248 |
| 5,802,144 A | | 9/1998 | Laird et al. | 379/32.04 |
| 5,812,524 A | | 9/1998 | Moran et al. | 370/228 |
| 5,832,196 A | | 11/1998 | Croslin et al. | 714/4 |
| 5,838,660 A | | 11/1998 | Croslin | 370/216 |
| 5,841,759 A | | 11/1998 | Russ et al. | 370/221 |
| 5,850,505 A | | 12/1998 | Grover et al. | 714/4 |
| 5,852,600 A | | 12/1998 | Russ | 370/228 |
| 5,862,125 A | | 1/1999 | Russ | 370/228 |
| 5,862,362 A | * | 1/1999 | Somasegar et al. | 703/21 |
| 5,867,689 A | * | 2/1999 | McLain et al. | 703/23 |
| 5,875,172 A | | 2/1999 | Tabata | 370/228 |
| 5,933,422 A | | 8/1999 | Kusano et al. | 370/331 |
| 5,943,314 A | | 8/1999 | Croslin | 370/216 |
| 5,991,338 A | | 11/1999 | Trommel | 375/224 |
| 5,999,286 A | * | 12/1999 | Venkatesan | 359/117 |
| 6,021,113 A | | 2/2000 | Doshi et al. | 370/228 |
| 6,026,073 A | | 2/2000 | Brown et al. | 370/216 |
| 6,026,077 A | | 2/2000 | Iwata | 370/254 |
| 6,044,064 A | | 3/2000 | Brimmage et al. | 370/248 |
| 6,049,529 A | | 4/2000 | Brimmage et al. | 370/248 |
| 6,104,695 A | | 8/2000 | Wesley et al. | 370/216 |
| 6,108,309 A | * | 8/2000 | Cohoe et al. | 370/241 |
| 6,137,775 A | * | 10/2000 | Barlett et al. | 370/216 |
| 6,154,448 A | | 11/2000 | Peterson et al. | 370/248 |
| 6,167,025 A | | 12/2000 | Hsing et al. | 370/216 |

\* cited by examiner

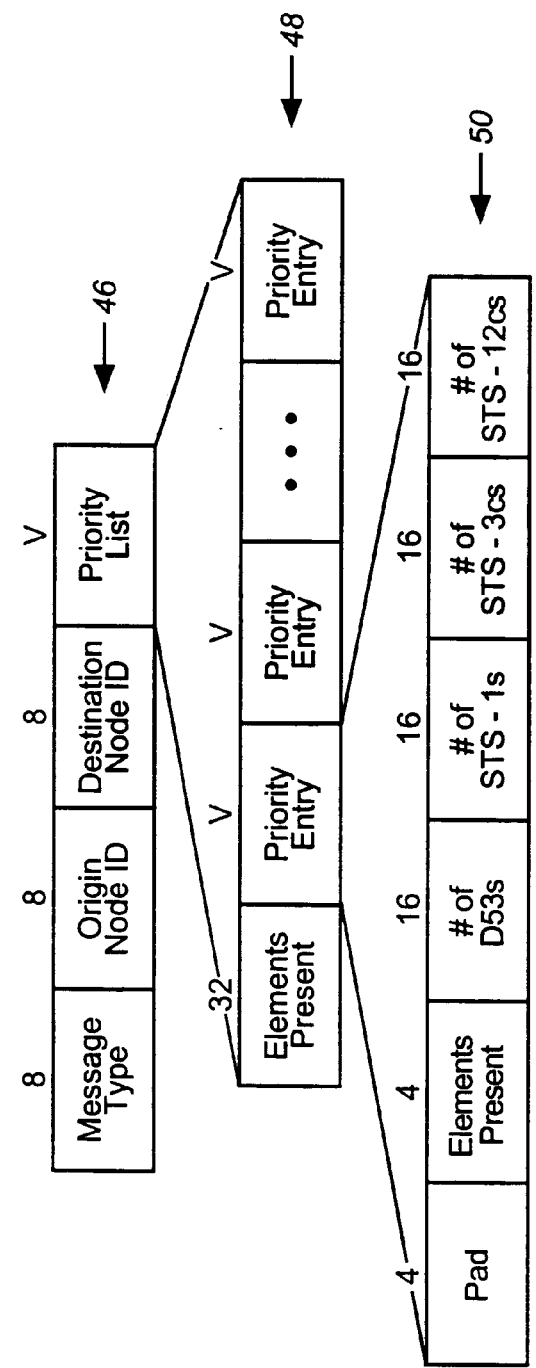

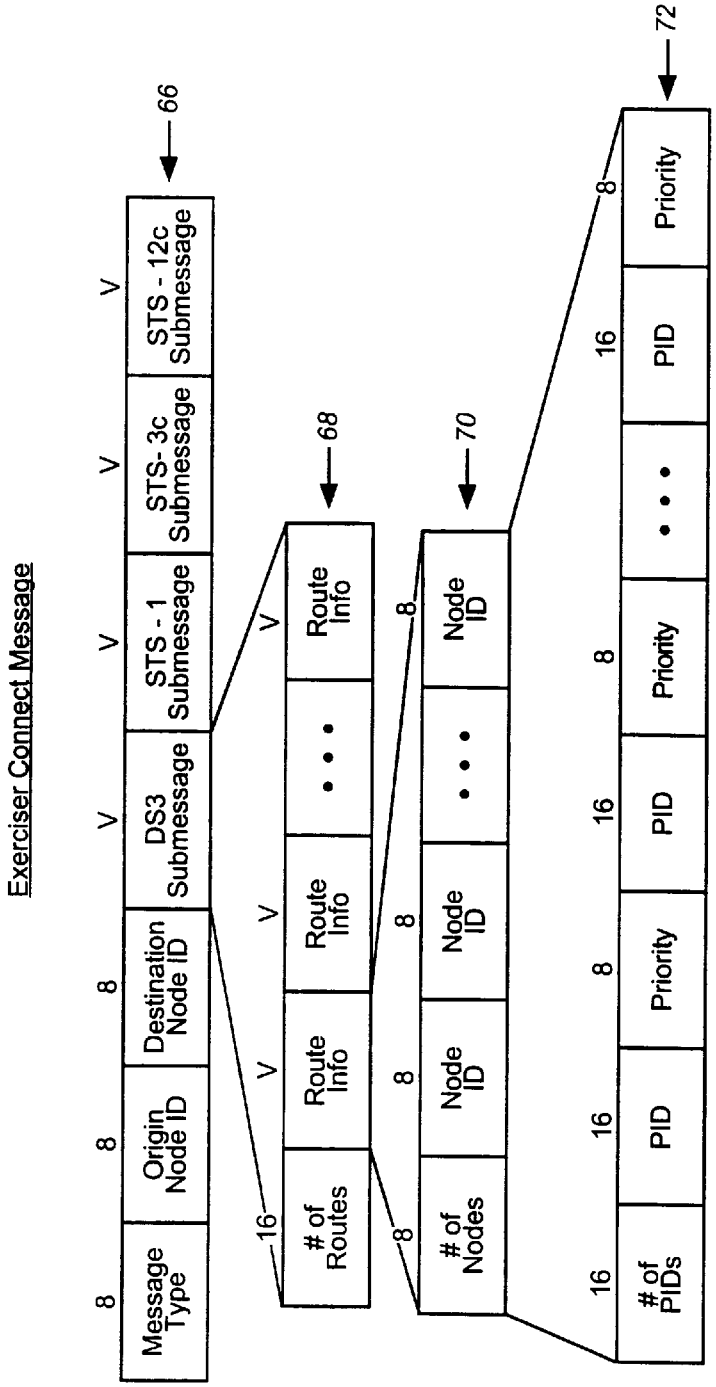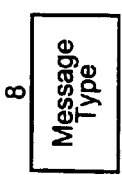

METHOD OF EXERCISING A DISTRIBUTED RESTORATION PROCESS IN AN OPERATIONAL TELECOMMUNICATIONS NETWORK

CROSS REFERENCE TO RELATED APPLICATIONS

The instant invention relates to the following applications having Ser. No. 08/825,440 filed Mar. 28, 1997, Ser. No. 08/825,441 filed Mar. 28, 1997, Ser. No. 09/046,089 filed Mar. 23, 1998, Ser. No. 09/148,944 filed Sep. 8, 1998 and Ser. No. 09/149,591 filed Sep. 8, 1998. The respective disclosures of those applications are incorporated by reference to the disclosure of the instant application.

The instant invention further relates to applications Ser. No. 08/483,579 filed Jun. 7, 1995, 08/736,800 filed Oct. 25, 1996 and 08/781,495 filed Jan. 13, 1997. The respective disclosures of those applications are likewise incorporated by reference to the instant application.

FIELD OF THE INVENTION

The instant invention relates to a telecommunications network provisioned with a distributed restoration scheme or algorithm (DTNR), and more particularly to the execution of the distributed restoration process in the distributed restoration algorithm provisioned telecommunications network in response to a simulated failure.

BACKGROUND OF THE INVENTION

In a telecommunications network having a plurality of interconnected nodes and provisioned with a distributed restoration algorithm or scheme, when a failure is detected anywhere in the network, the various nodes would automatically determine and implement the switching actions that can circumvent the failure. In the case of a failure of a network path, the various nodes or switches of the network would communicate with each other to ascertain the available capacity that may be used for restoral. In most of the distributed restoration algorithm (DRA) schemes, the nodes have no prior knowledge of the topology of the network.

When a designer of a telecommunications network contemplates which of the many DRA approaches to apply to a given network, it is generally necessary for the designer to perform extensive simulations to gauge the adequacy and performance of the different approaches. Such simulations are particularly important for identifying anomalous behavior of the network that otherwise is difficult to anticipate because of the dynamic multi-processing that takes place in such a network.

Although a simulation is useful for estimating the functionality of a DRA scheme prior to its implementation in the network, there are some aspects that remain best to be measured in a "live" or operational network. Such aspects include the actual speed and behavior of the network during the restoration process. Further aspects that make simulations not as accurate include action propagation delays, topological changes, different software versions and unanticipated conditions that cause the simulations to differ from actual empirical findings.

There is therefore a need for means to superimpose a DRA simulation process within a "live" traffic bearing network without actually performing any of the switching that would disrupt traffic. In other words, the DRA algorithm needs to be exercised as if there is an actual failure, so that the performance of the network in a failure scenario can be more accurately measured. Moreover, in order not to tie up the network in the event that an actual failure does occur during the restoration exercise, an actual distributed restoration process needs to take over in the event of an actual failure.

BRIEF SUMMARY OF THE INVENTION

To practice the instant invention restoration process in an operational DRA telecommunications network, an exercise information message is provided to one of the nodes of the network. This exercise information message contains information or data relating to a simulated failure and missing in-band information that would have been exchanged over recovered links during a real event. Some of the data included in the failure information include the origin-destination pair of the nodes, the failed paths and the recovered links, if any. Also included in the exercise information message is data relating to potential staggered cuts between the origin-destination pair.

Upon receipt of the exercise information message, a distributed restoration process begins. But instead of utilizing and exchanging the various messages that are required for flooding the network and locating the spare or reusable capacity for rerouting the traffic, a set of structurally similar exercise messages are used. These messages include an exerciser failure notification message, an exerciser explore message, an exerciser return message, an exerciser connect message, and an exerciser step completed message. Given that the structure of the various exerciser messages are the same as messages that are used in the event of a real failure in the network, the distributed restoration process would operate as if an actual failure has occurred. Thus, the network reacts by restoring what it perceives to be a disruption of the traffic by the simulated failure.

To ensure that no actual cross-connections take place, the exerciser messages are configured to enable the network to execute the distributed restoration process only up to the point where cross connections are to be made. In the event that an actual failure does occur during the exercise restoration process, the network is provided with a preemption functionality that takes the network out of the exercise restoration process, once an actual fault is detected, so that an actual distributed restoration process can take place. To ensure that the exercise restoration process does not tie up the network for an indefinite period, a drop-dead timer is provided to each of the nodes of the network so that the execution of the exercise restoration process ends with the expiration of the timer, irrespective of whether or not the exercise restoration process has been completed.

As the exercise restoration process is taking place, the reaction of the various nodes of the network, as well as the network itself, are measured and collected. The thus collected data are then provided to the designer of the network, or the management of the network as a feedback on how the network would react to certain failures. A better design of the restoration process of the network could therefore be effected.

It is therefore an objective of the present invention to execute a distributed restoration process in a "live" traffic bearing telecommunications network without actually performing any switching or cross connections that could disrupt traffic using the same DRA scheme that would be employed in the event of an actual failure.

It is moreover an objective to the present invention to collect accurate measurements of the reactions of the network in response to a failure, without actually provoking such failure that ends up disrupting the traffic within the network.

It is still another objective of the present invention to provide a simulation restoration process that immediately yields to any actual failure event that occurs during the simulation restoration process.

It is yet still another objective of the present invention to provide a simulation restoration process that is capable of performing restoration in a particular sequence in response to multiple failures.

BRIEF DESCRIPTION OF THE FIGURES

The above-mentioned objectives and advantages of the present invention will become apparent and the invention itself will be best understood by reference to the following description of an embodiment of the invention taken in conjunction with the accompanying drawings, wherein:

FIG. 3 illustrates the structure of an exerciser failure notification message of the instant invention;

FIG. 4 is an illustration of the structure of an exerciser explore message of the instant invention;

FIG. 6 is an illustration of the structure of an exerciser connect message of the instant invention;

FIG. 7 illustrates the structure of an exerciser step completed message of the instant invention.

DESCRIPTION OF THE INVENTION

Figure 1:
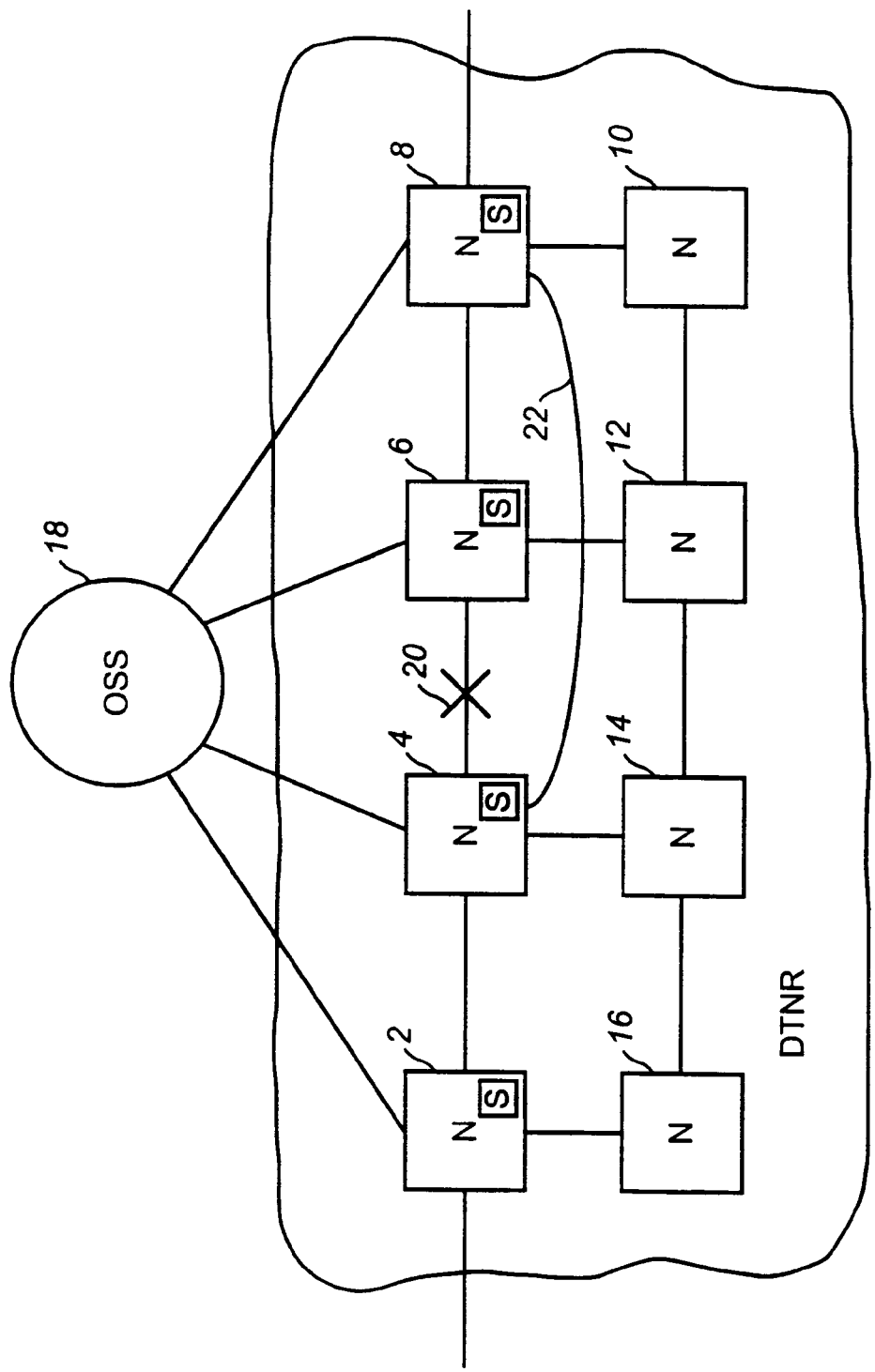
FIG. 1 is a topology of an exemplar telecommunications network provisioned with a distributed restoration algorithm or scheme.

With reference to FIG. 1, a telecommunications network having a plurality of interconnected nodes is shown. The interconnecting nodes are each provisioned with the ability to dynamically restore traffic disrupted along paths interconnecting those nodes, as there is stored in each of the nodes 2–16 a distributed restoration algorithm (DRA). As such, nodes 2–16 are part of the distributed restoration network, or more specifically the dynamic transmission network restoration (DTNR) domain. Each of the nodes in the DTNR domain is connected to an operation support system (OSS) 18 from which the management of the network can oversee the operation of the network. For the sake of simplicity, only nodes 2–8 are shown to be connected to OSS 18.

As is known from the above-noted applications, when a failure or fault, such as 20, occurs between two adjacent nodes, such as for example nodes 4 and 6, the network will begin a restoration process to find an alternate path for bypassing the failure 20 between nodes 4 and 6. Such alternate route may begin by a designation of adjacent nodes 4 and 6 as custodial nodes, with node 4, which has the lower number, being designated s the origin node while node 6 being designated the destination node. An alternate path that reroutes the disrupted traffic could be one consisting of node 4, node 14, node 12 and node 6. Another possible alternate path that connects origin node 4 to destination node 6 is by way of link 22 so that node 4 is first connected to node 8, which then is connected to node 6. Parameters may be provided to the distributed restoration algorithm to enable the network to decide which is the better route, be it route 4–14–12–6 or 4–8–6. But in order to provide those parameters, the designer of the network has to perform a great number of simulations. Yet these simulations provide only an estimation of how the DRA provisioned network would react in response to a failure.

The inventors of the instant invention recognize that to obtain a true response, a simulation failure needs to be performed in a "live" DRA provisioned network, so that real data may be collected therefrom. This is because no matter how well prepared a simulation is, things such as message delays, topological changes and other unanticipated conditions can occur in a dynamic processing network such as a DRA provisioned network.

Figure 2:
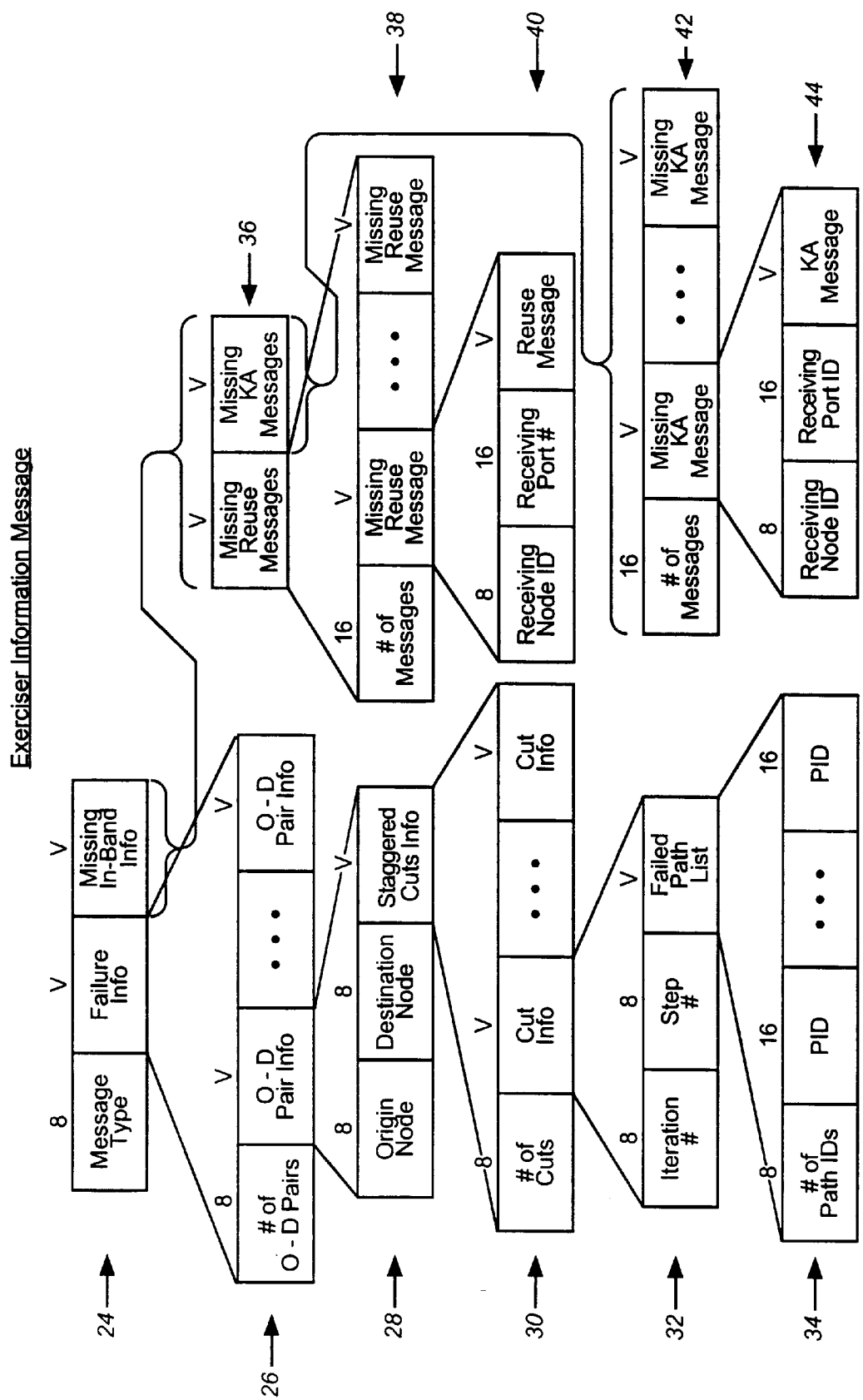
FIG. 2 is an illustration of the structure of an exerciser information message of the instant invention.

To enable simulation of a failure in an operational network, an information message such as the exerciser information message shown in FIG. 2 is first provided by the management of the network to any one of the nodes 2–10 of the network shown in FIG. 1. Such provision of the exerciser information message can readily be expedited by OSS 18 inputting to a node, for example node 4, the information message. Using basic DRA procedures, this exerciser information message is then broadcast from node 4 to the other interconnected nodes of the network. Accordingly, each of the nodes in the network is provisioned with the exerciser information message, and therefore becomes aware of the simulation failure input to the network. At this time, as is during the whole restoration process in response to the simulation failure, the network is "live", as it is operational.

Focus to FIG. 2. It can be seen that the exerciser information message, at its topmost level as designated by 24, comprises three sections—a Message Type field that is comprised of 8 bits, a variable length Failure Info field and a variable length Missing In-Band Info Field. To identify the message as an exerciser information message, the message type is chosen to have a value of "10". Of course, other values may instead be used for identifying the message as an exerciser information message.

Expanding on the Failure Info field of the message at level 24, the failure info field is shown to be comprised of a number of fields including an 8 bit Number of O-D Pairs field and a plurality of variable length O-D Pair Info fields. The Number of O-D Pairs field contains the number of origin-destination pairs with failed paths between them, while the O-D Pair Info field contains failure information pertaining to an origin-destination pair. The specific format of the O-D Pair Info field is shown by structure 28 to comprise an 8 bit Origin Node field, an 8 bit Destination Node field and a variable length Staggered Cuts Info field. The Origin Node field designates the node ID of an origin node. The Destination Node field designates the node ID of the corresponding destination node. And the Staggered Cuts Info field contains information about staggered cuts for this particular origin-destination pair.

As shown by the structural level designated 30, the Staggered Cuts Info field in turn includes an 8 bit Number of Cuts and a plurality of variable length Cut Info fields. The Number of Cuts field contains the number of Cuts Info fields in the message, while the Cut Info field contains the failed paths and the step number at which they failed.

The Cut Info field is further illustrated by the structure designated 32. There, the Cut Info field is shown to comprise an 8 bit Iteration Number field, an 8 bit Step Number field and a variable length Failed Path List field. The Iteration Number field provides the iteration number at which the cut happens. The Step Number field provides the step number within the iteration specified in the Iteration Number field at which the cut happens. The Failed Path List field provides the list of failed path IDs (PIDs).

Structure 34 expands on the structure of the Failed Path List field. As shown, the Failed Path List lists the number of 16 bit PID fields. The number of path IDs is contained in the Number of Path IDs field, while the PID fields each contain the ID of a failed path. This may be in the form of an origin access/egress port number, and it is a unique identifier of the path from the origin node to the destination node for the particular origin-destination pair.

Return to level 24. There the exerciser information message is shown to also include a variable length Missing In-band Info field. This field is necessary insofar as some in-band messages are exchanged over recovered links during a real event. And since the exerciser information message is used in a non-event and no actual cross-connections are made, there are no recovered links in the exercise. Hence, the information in the In-band Info field provides the various nodes of the network the necessary data to act as if an actual failure has occurred.

The Missing In-band Info field is further illustrated to include a variable length Missing Reuse Messages field and a variable length Missing KA (keep alive) Messages field, as shown at 36.

Proceeding with the Missing Reuse Messages field, note that, as shown at 38, the Missing Reuse Messages provides data to the nodes of the network in regard to the reuse messages that would be exchanged over recovered links during a real event. The number provided in the Number of Messages field indicates the number of Missing Reuse Message fields that are attached to the message, and each of the Missing Reuse Message fields contains a reuse message that could be exchanged over a recovered link during a real event. Elaborating, as shown by the structure at 40, each Missing Reuse Message field includes an 8 bit Receiving Node ID, a 16 bit Receiving Port Number and a variable length Reuse Message field. The Receiving Node ID field contains the node ID of the source or destination node that would have received this reuse message if it had been a real event. The Receiving Port Number field contains the number of the port on a source or destination node that would have received the reuse message if it had been a real event. The reuse message of course is stored in the variable length Reuse Message field.

The second portion of the Missing In-band Info field is the Missing KA messages field, as shown per structure 36. This Missing KA Messages field in turn includes a 16 bit Number of Messages field and a plurality of variable length Missing KA Message fields, as shown at 42. The number of Missing KA Message fields in the message is indicated in the Number of Messages field, while each of the Missing KA Message field contains a keep alive message that would be exchanged over recovered links during a real event. As shown at 44, each of the Missing KA Message fields includes a 8 bit Receiving Node ID field, a 16 bit Receiving Port ID field and a variable length KA Message field. The receiving node ID field provides the ID of the node that contains the working port that would have received the keep alive message if it had been a real event. The receiving port ID field contains the number of the port that would have received the keep alive message if it had been a real event, and the KA Message field of course contains the keep alive message.

Once the exerciser information message is provided to one of the nodes of the network and further propagated to the remaining nodes of the network, the exercise restoration process begins. The various messages that flow between the nodes for executing the restoration process are structurally the same as the messages that would have occurred if an actual failure had occurred. Thus, there are five different messages that are used for the exercise restoration process. They are: an exerciser failure notification message, an exerciser explore message, an exerciser return message, an exerciser connect message, and an exerciser step completed message.

The exerciser failure notification message is shown in FIG. 3 as comprising a number of fields. The first field is an 8 bit Message Type field that, for the instant invention embodiment, will have either a value of "0" during a real event or a "5" during an exercise. The second field in the exerciser failure notification message is the SW Revision field which contains the revision number of the software of the instant invention. The number of hop counts is contained in an 8 bit Number of Hop Counts field. The first iteration of the hop count is contained in an 8 bit Hop Count 1 field while the last iteration of the hop count value is contained in an 8 bit Hop Count n field.

As shown in FIG. 4, the exerciser explore message has a structure that has four fields, as shown at 46. The exerciser explore messages are broadcast from the origin node towards the destination node in search of the spare or reusable capacity (or links) in the network. As disclosed in the aforenoted related applications, the explore messages are forwarded by tandem nodes to all other nodes in the network.

Returning to FIG. 4, note that the 8 bit Message Type field, for the instant invention embodiment, will either have a value of "1" during a real event, or "6" during an exercise. For the exerciser explore message of FIG. 4, the Message Type field will of course contain a "6". The 8 bit Origin Node ID field contains the ID of the origin node, while the 8 Destination Node ID field contains the ID of the destination node. The variable length Priority List field contains information about failed working paths belonging to the particular origin-destination pair indicated in the message. This information is organized by the priorities of the failed working paths and is further shown at 48 to include a 32 bit Elements Present field and 32 variable length Priority Entry fields. The Element Present field is a 32 bit bit map that has one bit for every priority. Thus, if the value of a bit is 1, the corresponding priority entry is present in the priority list. And if the bit is 0, the corresponding priority entry is not present. The priority entry fields each contain information about failed working paths belonging to the origin-destination pair of the exerciser explore message, and having the particular priority. The types of paths are DS3, STS-1, STS-3c, or STS-12c.

The particulars of each of the priority entry fields are shown at 50. The 4 bit Pad field is used to maintain byte alignment. The 4 bit Elements Present field is a 4-bit map that has one bit for every failed working path type. If the value of the bit is 1, its corresponding type entry is present in the priority list. If the bit is 0, its corresponding type entry is not present. Bit 0 corresponds to DS3, bit 1 corresponds to STS-1, bit 2 corresponds to STS-3c, and bit 3 corresponds to STS-12c. If a type entry is not present, its value is 0. The Number of DS3s field contains the number of failed working DS3s of this priority with the particular origin-destination node pair. A failed working DS3 that was embedded in a SONET signal is counted in this field. The Number of STS-1s field, which has 16 bits, contains the number of failed working STS-1s not carrying embedded DS3s of the particular priority of the origin-destination node pair of the exerciser explore message. A failed STS-3 is counted as up to 3 STS-1s, and a failed STS-12 is counted as up to 12 failed STS-1s. The Number of STS-3cs field contains the number of failed working STS-3cs of the particular priority of the origin-destination node pair. The Number of STS-12cs field contains the number of failed working STS-12cs of the particular priority of the origin-destination node pair in issue.

Figure 5:
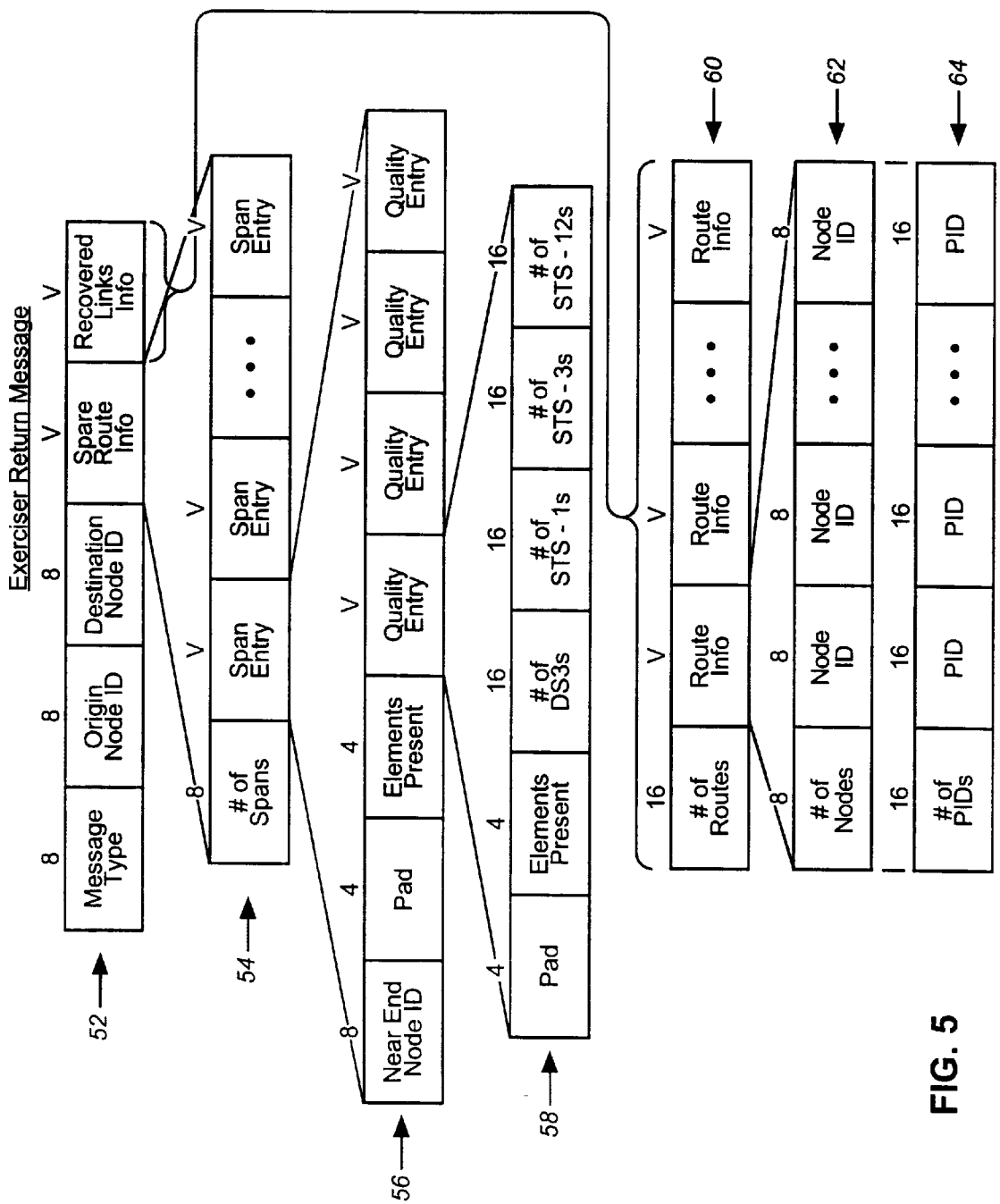
FIG. 5 is an illustration of the structure of an exerciser return message of the instant invention.

In FIG. 5, the structure of the exerciser return message is shown to include an 8 bit Message type field, an 8 bit Original Node ID field, an 8 bit Destination Node ID field, a variable length Spare Route Info field and a variable length Recovered Links Info field. The exerciser return message is used to convey information to the origin nodes about the spare and reusable capacity or links in the network. These messages follow the same paths as the explore messages but they travel in the opposite directions. The Message Type field of the exerciser return message contains a value of "7". During a real event, the Message Type field of a return message would contain a value of "2". The Origin Node ID field contains the ID of the Destination Node. The Spare Route Info field contains information about the spare capacity in the network that has been allocated to the origin-destination pair of the message by the tandem nodes. The information is organized into an ordered list of spans. These spans together form a route from the origin node to the destination node. The Recovered Links Info field is used to inform the origin node of released working capacity between the destination node and its closest custodial node.

The Spare Route Info field of the exerciser return message is further illustrated at 54 to include an 8 bit Number of Spans field and from 0–255 Span Entry fields. The Number of Spans field provides the number of Span Entry fields in the Spare Route Information field. Each Span Entry field contains information about the spare capacity in that span that has been allocated to the origin/destination pair of the message by the tandem nodes. The information is organized by quality, as described below.

As shown at 56, each Span Entry field is further divided into an 8 bit Near End Node ID field, a 4 bit Pad field, a 4 bit Elements Present field and a plurality of variable length Quality Entry Fields. The Near End Node ID field contains the node ID of the node on the span that is closest to the origin node along the return path. The Pad field provides byte alignment, as any data can be put in this field. The Elements Present field is a 4 bit bit map that has one bit for every failed working path type. If the value of the bit is 1, its corresponding type entry is present in the quality list; and if the bit is 0, its corresponding quality entry is not present. Each Quality Entry field contains link type information about the spare capacity of the particular quality on the span that has been allocated to the origin/destination node pair by the tandem nodes. The types of quality can be DS3, STS-1, STS-3, or STS-12.

As shown at 58, a Quality Entry field includes a 4 bit Pad field, a 4 bit Elements Present field and four 16 bit fields each containing a particular type of path. As before, the Pad field is used to maintain the byte alignment. Any data can be put into this field. The Elements Present field is a fraud-bit map that has one bit for every failed working path type. If the value of a bit is 1, its corresponding type entry is present in the quality list; and if the bit is 0, its corresponding quality entry is not present. Bit 0 corresponds to DS3, bit 1 corresponds to STS-1, bit 2 corresponds to STS-3 and bit 3 corresponds to STS-12. If a type entry is not present, its value is 0. The Number of DS3s field contains the number of spare DS-3s in the span having the particular quality with the origin/destination node pair of the message. The Number of STS-1s field contains the number of spare STS-1s in the span having the particular quality for that origin/destination pair. Similarly, the number of spare STS-3s and the number of STS-12s for the particular span of that quality are indicated in the last two fields of level 58 of the shown return message structure.

As noted above, the exerciser return message also has a variable length Recovered Links Info field. As shown at 60, the Recovered Links Info field has a 16 bit Number of Routes field and a plurality of variable length Route Info fields, the number of which is indicated in the Number of Routes field. Each of the Route Info fields contains information about the recovered links in one route between the destination and its closest custodial node.

As shown more clearly at 62, a Route Info field has an 8 bit Number of Nodes field and a plurality of Node ID fields, the number of which corresponds to the number provided in the Number of Nodes field. The node IDs are in an ordered list which describes a route from the destination to its closest custodial node. The first element of this list is the custodial node. The last element of the list is the node closest to the destination node. The ID of the node in a failed path is given in the node ID field. The Route Info field can also be represented by the structure shown at 64 where the Number of Nodes field is replaced by a Number of PIDs field, and the Node ID fields are replaced by PID fields. Each of the fields of the structure of 64 has 16 bits. The number of PID fields is provided in the Number of PIDs field, and each PID field contains the origin access/egress port number and therefore is a unique identifier of a path from the origin node to the destination node.

The next message that is used for exercising the restoration algorithm is the exerciser connect message shown in FIG. 6. Connect messages contain information about what cross-connections need to be made by the tandem and destination nodes. These messages are sent from the origin node to the destination node by way of the tandem nodes. In particular, at 66, the exerciser connect message is shown to include an 8 bit Message Type Message field, an 8 bit origin Node ID field, an 8 bit Destination Node ID field and a number of variable length Sub-message fields. For the exerciser connect message, an "8" is indicated in the Message Type field. If there is a real event, the value of the Message Type field will be "3". The ID of the Origin Node is given in the origin node ID field while the ID of the destination node is provided in the Destination Node ID field. The DT3 Sub-message field contains information about what connections need to be made on the tandem and destination nodes to reroute failed working DS3 paths between the origin and destination nodes of this message. The STS-1 Sub-message field contains information about the connections needed to be made on tandem and destination nodes to reroute failed working STS-1 paths between the origin and the destination nodes. It has the same format as the DS3 Sub-message field. The STS-3 Sub-message field contains information about the connections needed to be made on tandem and destination nodes to reroute failed working STS-3c paths between the origin and destination nodes. It has the same format as the DS3 Sub-message field. Lastly, the STS-12c Sub-message field contains information about the connections that need to be made on tandem and destination nodes to reroute failed working STS-12c paths. It also has the same format as the DS3 Sub-message field.

The DS3 Sub-message field structure is further illustrated at 68 to include a 16 bit Number of Routes field and a number of variable length Route Info fields, the number of which being determined by the value in the Number of Routes field. Each of the Route Info fields contains information about the types of connections needed to be made along that route on tandem and destination nodes to reroute failed working DS3 paths between the origin and destination nodes of the exerciser connect message. It also contains information about what failed working paths are to be rerouted over this route. This same is true for the STS-1, STS-3c and STS-12c paths.

The Route Info field is further shown, at 70, to include an 8 bit Number of Nodes field and a number of 8 bit Node ID fields. The Number of Nodes field contains the number of Node ID fields in the Route Info field. The node IDs are in an ordered list. It describes a route from the node that receives the message to the destination node. The first element of the list is the node after the node that receives the message. The last element of the list is the tandem node closest to the destination node. The Node ID field contains the ID of the node in the alternate path.

The Route Info field also contains the structure shown at 72. In particular, it includes a 16 bit Number of PIDs field, and a number of 16 bit PID and 8 bit Priority fields. The Number of PIDs field contains the number of PID and Priority fields in the Route Info field. Each of the PID fields contains the origin access/egress port number. It is a unique identifier of the failed working path between the origin and destination nodes of the message. Each of the Priority fields contains the priority of the failed working path identified by the previous PID field. It may contain a number anywhere from 0–31.

The last message that is used in the exercise restoration process of the instant invention is the exerciser step completed message shown in FIG. 7. These messages are sent by the origin node and the destination node to indicate that a path failure has been detected and validated. As shown, the exerciser step completed message has a single Message Type field that has 8 bits. In the case of an exerciser message, the value of the field is "9". When there is an actual failure occurs, the value of the Message Type field is "4".

Given the above discussed messages, a DTNR network can execute an exercise restoration process during normal operations, i.e., while the network is "live". In addition to validating the DRA performance, results for the exerciser simulated outage scenarios can be used to determine the status of the network spare capacity. The exerciser restoration process can also be used as a diagnostic evaluation and/or spare capacity planning tool for further analysis of the network. To begin the exercise restoration process, the management of the network needs to provide a simple command and input the exercise information message. The type of restoration process to be undertaken of course depends on the kind of data provided in the exercise information message, which supplies the simulated failure or failures which the network is faced with, and which the DRA restoration process needs to proceed against. To ensure that the network is aware that it is running an exercise restoration process, as was noted above, the exerciser information message is provided at the beginning of the exercise. There are also, per the messages shown in FIGS. 3–7, special exerciser message types provided to the network. Finally, the network is provisioned with the knowledge that no cross-connections are made for the exercise restoration process. Thus, when a node receives an exerciser message during the explore, return, or the connect phase of the algorithm, it follows the same rules as specified for the equivalent non-exerciser versions of those messages with the exception that no cross-connections be made.

To ensure that the network is not tied up by the exercise restoration process when there is an actual failure, the exercise restoration process is further provisioned with the functionality that a real outage will always preempt an ongoing exercise restoration process. The node will act as if the exercise has terminated in a normal way. So, too, an exercise restoration process will not be allowed to begin if a real restoration event or another exercise restoration event is in progress. Moreover, an exercise restoration process that is in progress can be terminated by an appropriate command at any time. Finally, a "drop-dead" timer is provided and starts when the exercise event begins and terminates when the exercise event ends. The timer therefore provisions a predetermined period of time during which the exercise event can take place. And in the unlikely event that the timer expires before the exercise restoration process ends, the exercise restoration process is terminated. This is to ensure that the exercise restoration process will end at some point in time.

Figure 8:
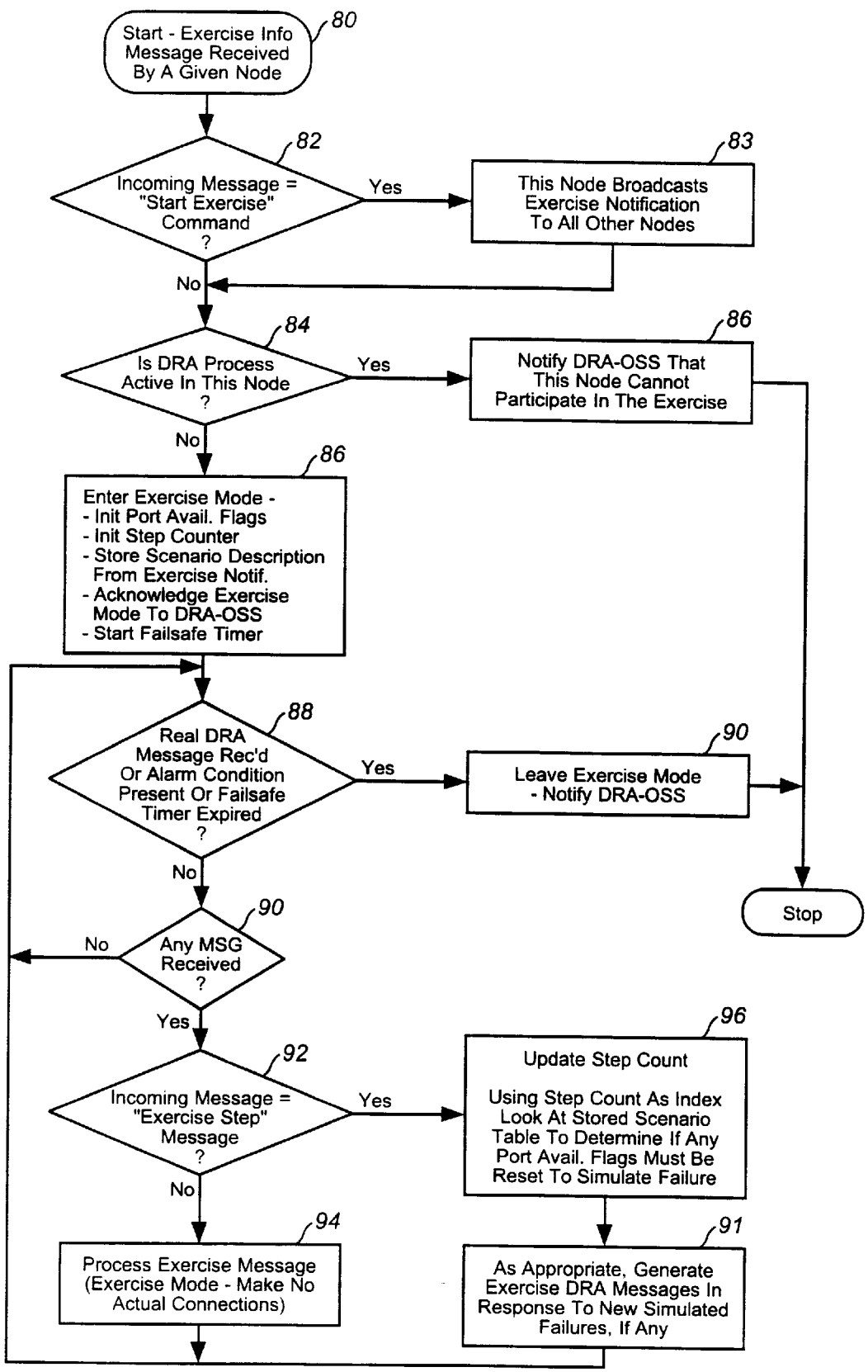
FIG. 8 is a flow chart for illustrating the operation of the instant invention.

FIG. 8 provides a flow chart of the steps executed within each node of the network for initiating, executing, and terminating a simulated failure with no disruption of normal traffic flow. To begin, an exercise information message is received by a given node in step 80. A query is then made at step 82 on whether the incoming message initiates the exercise restoration process. If it does, the exercise information message is broadcast to all other nodes of the network, per step 83. Thereafter, the process proceeds to step 84 by determining whether the DRA process is active in the node. If the incoming message is determined not to be the start exercise command in step 83, then the process proceeds directly to step 84 to determine whether the DRA process is active in the node. In either case, if the DRA process is active, a notification is provided to OSS 18 that the particular node cannot participate in the exercise restoration process, per step 86. Thereafter, the process ends.

On the other hand, if it is determined that the DRA process is not active for the particular node, the process proceeds to step 86 whereby the exercise mode is entered. A number of things need to take place. These include initializing the port available flags, the step counter, the store scenario description from the exercise notification message, the acknowledgment that it is entering into an exercise mode to the OSS, and the start of the drop-dead timer.

Thereafter, as the exercise restoration process progresses, the process remains on the look-out for whether an actual failure message is received, an alarm condition present, or the drop-dead timer has expired, per step 88. If any one of those conditions is met, then the exercise restoration process is terminated and the OSS is notified, per step 90. Thereafter, the process stops.

But if none of the conditions on the look-out step 88 occurs, the process continues to be on the look-out for any message being received, per step 90. If there is no received message, the process continues. But if there is a received message, a determination is made in step 92 on whether this received message is an exercise step message. If it is not, the exercise restoration process continues without making any actual cross-connections, per step 94. The process continues and returns to step 88 to look-out for any new messages, alarms, or the expiration of the timer.

If the incoming message in step 92 is indeed an exercise step message, the step count is updated. This updated step count is then used as an index to look at the stored scenario table to determine if any port available flag must be reset to simulate the failure, per step 96. This is used in the event that multiple cuts or staggered cuts are being simulated. Thereafter, at step 98, if appropriate, exercise DRA messages in response to any new simulated failures are generated. The process then once more returns to step 88 to await the receipt of any real DRA notification, alarm conditions or the expiration of the timer. Note that, during any point of the forgoing process steps, OSS 18 can send a command to terminate or abort the exercise restoration process.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only the spirit and scope of the hereto appended claims.

What is claimed is:

1. A method of practicing an exercise restoration process in a telecommunications network provisioned with a distributed restoration scheme and having a plurality of interconnected nodes, comprising the steps of:
   a) providing an exercise information message to one of said nodes, said one node propagating said exercise information message to the other nodes of said network, said exercise information message including information relating to at least one simulated failure occurring in said network;
   b) executing a distributed restoration process in said network based on the information provided by said exercise information message up to the point of making any cross-connections;
   c) collecting data relating to said distributed restoration process,
   d) provisioning each of said interconnected nodes of said network with a predetermined time period for practicing said exercise restoration process so that said exercise restoration process ends at the expiration of said predetermined time period irrespective of whether said exercise restoration process is in progress,
   e) ending said exercise restoration process if an actual failure occurs while said exercise restoration process is in progress, and
   f) receiving an appropriate command to terminate said exercise restoration process in progress.

2. The method of claim 1, wherein said step b) further comprises the steps of:
   sending, from a node determined to be an origin node in accordance with said exercise information message, at least one failure notification message towards a node determined to be a destination node in accordance with said exercise information message to indicate that said failure has been detected and validated; and
   broadcasting, from said origin node, explore messages to other nodes in said network for searching spare or reusable capacity in said network for rerouting traffic disrupted by said failure, said explore messages being propagated by said other nodes towards said destination node.

3. The method of claim 2, wherein said other nodes are tandem nodes through which messages are routed between said origin and destination nodes, said step b) further comprising the steps of:
   said tandem nodes propagating said explore messages towards said destination node; and
   said tandem nodes propagating return messages containing information relating to spare and reusable capacity towards said origin node.

4. The method of claim 2, wherein said step b further comprises the steps of:
   said origin node sending at least one connect message towards said destination node by way of at least one of said other nodes, said connect message containing information on the cross connections required to be made to the nodes of said network for restoring any traffic disrupted by said failure.

5. The method of claim 1, wherein said exercise information message includes missing in-band data and data relating to multiple failures, said method further comprising the step of:
   executing said distributed restoration process in a particular sequence in response to said multiple failures.

6. The method of claim 1, further comprising the steps of:
   providing said collected data to the management of said network so that said management can use collected data as a feedback on the operation of said distributed restoration scheme.

7. In a telecommunications network of distributed restoration provisioned interconnected nodes, a method of effecting a restoration process without an actual failure having occurred in said network, comprising the steps of:
   a) providing an information message including data of a simulated failure to one of said interconnected nodes;
   b) propagating said information message to all remaining said interconnected nodes;
   c) executing a distributed restoration process based on the data of a simulated failure provided by said information message wherein said restoration process is terminated if an actual failure occurs with the network, wherein step c) further comprises the steps of:
      i) provisioning each of said interconnected nodes of said network with a predetermined time period for executing said restoration process,
      ii) executing said restoration process up to the point of making any y cross-connections, and
      iii) ending said restoration process when a predetermined time period expires; and
   d) collecting data relating to said distributed restoration process.

8. The method of claim 7, wherein said step a further comprises the steps of:
   incorporating into said information message missing in-band data; and
   determining an origin node and a destination node based on data provided by said information message.

9. The method of claim 8, wherein the nodes in said network other than said origin and destination nodes are tandem nodes, said method further comprising the steps of:
   effecting said origin node to broadcast explore messages towards said destination node via said tandem nodes;
   effecting said tandem nodes to propagate return messages containing information relating to spare and reusable capacity towards said origin node.

10. The method of claim 9, wherein in receipt of at least one of said return messages, said origin node sends a connect message containing information on the cross connections required to be made to said tandem nodes for restoring any traffic disrupted by said failure.

11. The method of claim 7, wherein said information message includes data relating to multiple failures, said method further comprising the step of:
   executing said distributed restoration process in a particular sequence in response to said multiple failures.

* * * * *